United States Patent [19]

Rips

[11] 4,252,753
[45] Feb. 24, 1981

[54] MANUFACTURE OF PLASTIC LENSES

[76] Inventor: Irving Rips, 135 N. Carson Rd., Beverly Hills, Calif. 90211

[21] Appl. No.: 938,427

[22] Filed: Aug. 31, 1978

Related U.S. Application Data

[62] Division of Ser. No. 843,170, Oct. 18, 1977, Pat. No. 4,132,518.

[51] Int. Cl.³ .............................................. B29D 11/00
[52] U.S. Cl. ..................................... 264/1.1; 264/236; 264/331
[58] Field of Search ...................... 264/1, 331; 432/11, 432/144, 145

[56] References Cited

U.S. PATENT DOCUMENTS

| | | | |
|---|---|---|---|
| 2,542,386 | 2/1951 | Beattie | 264/1 |
| 3,422,168 | 1/1969 | Bowser | 264/1 |
| 3,625,493 | 12/1971 | Hunter | 432/145 |
| 3,830,624 | 8/1974 | Sperring et al. | 432/145 |
| 3,880,578 | 4/1975 | Chartet | 432/145 |
| 4,095,772 | 6/1978 | Weber | 264/1 |

*Primary Examiner*—James B. Lowe
*Attorney, Agent, or Firm*—James E. Brunton

[57] ABSTRACT

A method and apparatus for forming lenses from a polymerizable monomeric liquid. In accordance with the method of the invention, the activated monomer is encapsulated within lens molds of unique design and is exposed to a precisely controlled atmosphere within the apparatus of the invention. More particularly, during the entire curing cycle of the monomer the molds are uniformly exposed to collimated streams of air maintained at closely controlled temperatures. The streams of air serve to precisely control the temperature of the monomer within the molds and to continuously remove the heat of exotherm from each individual mold.

4 Claims, 8 Drawing Figures

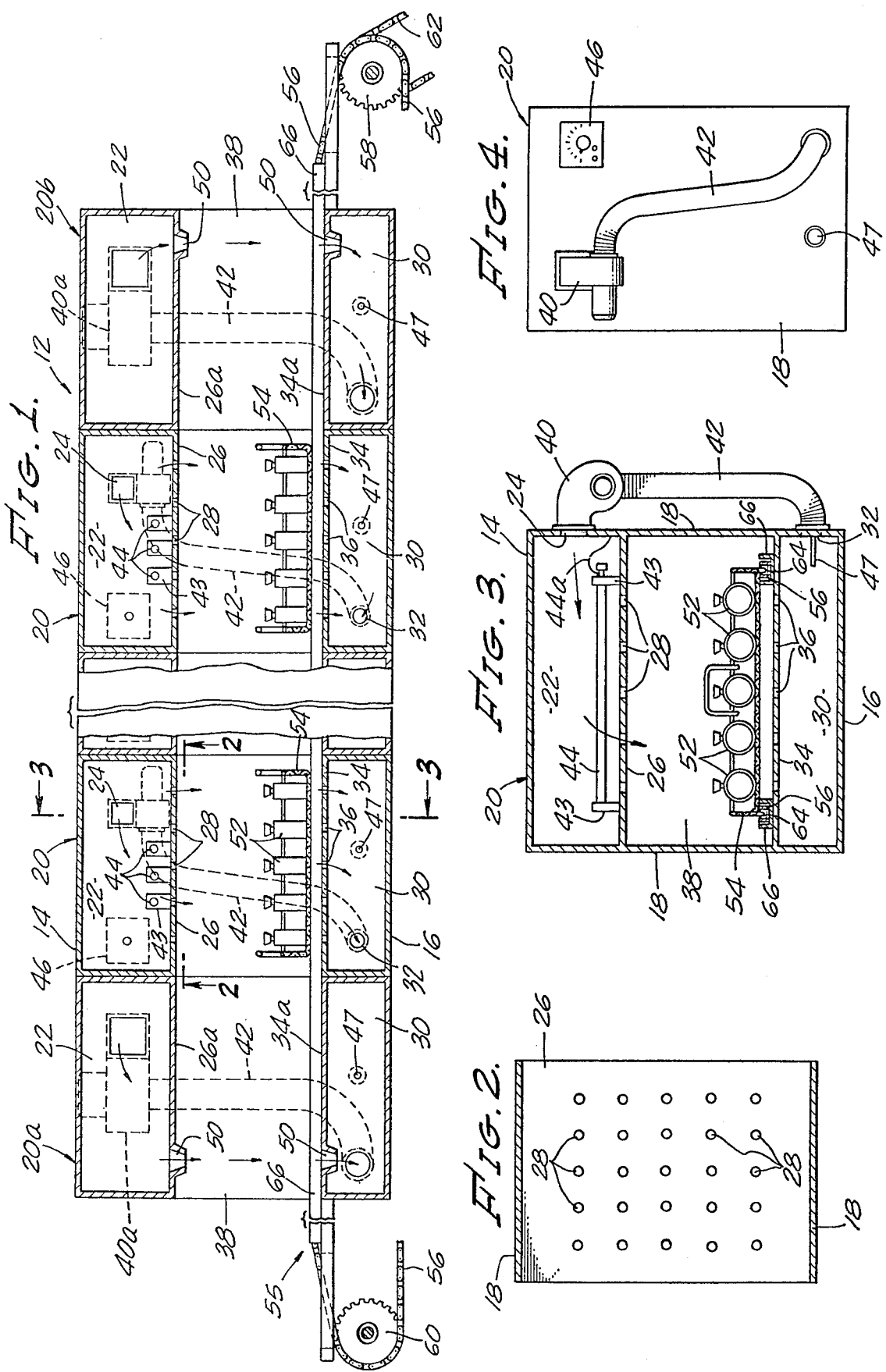

MANUFACTURE OF PLASTIC LENSES

This is a division of application Ser. No. 843,170, filed Oct. 18, 1977, now U.S. Pat. No. 4,132,518.

BACKGROUND OF THE INVENTION

1. Field of the Invention

The present invention relates to a method and apparatus for forming finished and semi-finished blanks for lenses. More particularly, the invention relates to a method and apparatus for forming blanks for opthalmic lenses from a polymerizable monomeric liquid which has been activated by a suitable catalyst.

2. Discussion of the Prior Art

Within the past twenty-five years, significant strides have been made in techniques for the manufacture of various types of lenses, including spectacle lenses, from plastic materials. When compared to the traditional glass lenses, plastic lenses offer the following significant advantages:

1. The weight is only 40 to 50 percent that of glass making possible the manufacturing of larger spectacle lenses than is feasible using glass.
2. Light transmission is 5 to 8 percent better than that of glass.
3. The tendency to fogging is reduced 60 to 75 percent because of the low thermal conductivity.
4. The impact resistance of many plastics is greater than that of case-hardened glass.
5. Fragmentation, when it does occur, usually yields larger and more obtuse segments than occurs with broken glass thereby making the plastic lenses much safer for use in eyeglasses.
6. Plastics are less affected than glass by high-velocity particles and welder's splatter, making plastic lenses highly desirable for use in safety glasses.
7. Fewer rings are apparent in strong minus lenses.
8. Production by molding or casting eliminates surfacing procedures.

Of all the materials suggested for use in the manufacture of plastic lenses, allyl diglycol carbonate shows perhaps the greatest promise. This material is a colorless organic monomeric liquid of low viscosity and low volatility. When a catalyst such as benzoyl peroxide or isopropyl percarbonate is dissolved in the monomer and heat is applied, the liquid gradually thickens to form a soft gel. With further heating, this gel hardens into an insoluable, infusible, clear, colorless solid.

Because of the unique properties of the thermoset plastics manufactured from allyl diglycol carbonate, the material is ideally suited for the production of opthalmic lenses. The material, when properly processed, is very strong, has excellent optical and dimensional stability and is highly solvent and temperature resistant. Certain characteristics inherent in allyl diglycol carbonate monomers and the catalysts or initiators used therewith, however, makes the design of large scale production processes using these materials most difficult. For example, the reaction between the monomer and the catalysts is highly exothermic, making precise process temperature control most difficult. Moreover, in large scale manufacturing operations, temperature control problems are magnified since the exotherm is nonuniform during the curing process with a very large exotherm occurring near the end of the polymerization cycle. Additionally, isopropyl percarbonate is a highly unstable chemical at room temperature and therefore must be kept at a temperature not above 0° F.

When allyl diglycol carbonate and isopropyl percarbonate are used in the manufacture of opthalmic lenses, it is particularly important to closely control processing temperatures. Failure to do so results in material warpage, excessive shrinkage, and unacceptable material linearity and molecular weight. Additionally, unless the processing temperatures are maintained within closely defined limits, the material produced will exhibit poor optical clarity, poor color stability and unsatisfactory abrasion resistance.

Because of control problems inherent in processing allyl diglycol carbonate and its catalysts, prior art lens manufacture has, for the most part, been accomplished by batch processing techniques with no continuous processing method having to date been successfully developed. Typically, prior art batch manufacturing methods involve mixing the materials, placing the liquid mixture in suitable molds and then curing the material in large ovens having vertically spaced apart mold-carrying racks. Due to the exothermic character of the materials, it is virtually impossible to achieve uniformity of temperature within the ovens. Consequently, in certain locations within the oven the material cures too rapidly and in other locations too slowly. The end result is gross nonuniformity of the end product. Although attempts have been made to circulate air through the ovens to control temperature, such attempts have been generally unsuccessful. This is largely due to the nonuniform addition of heat of exotherm to the system by the material itself as it cures.

In addition to the aforementioned drawbacks of prior art methods, batch processing techniques are inherently cumbersome, inefficient, and expensive. For example, in order to avoid temperature shock to the material, the batch processing ovens must be shut down and allowed to cool after each curing cycle. This constitutes inefficient use of the equipment and markedly increases the cost of manufacture.

The method and apparatus of the present invention for the continuous manufacture of opthalmic lenses effectively overcomes the drawbacks of prior art techniques in a highly novel manner. In accordance with the method of the present invention, the material curing process is accomplished by passing the molds containing the activated monomer through an elongated curing apparatus made up of a plurality of individually controlled air-circulating units. As the molds are automatically carried through the apparatus of the invention they are sequentially exposed to collimated streams of air maintained at a predetermined elevated temperature. The streams of air serve to controllably heat the material within the molds and at the same time carry away the heat of exotherm. In this way, the temperature of the material within each mold can be uniquely and precisely controlled throughout the entire curing or polymerization cycle. The system is designed to operate continuously and automatically thereby maximizing the use of the equipment and minimizing labor costs.

SUMMARY OF THE INVENTION

It is an object of the present invention to provide a continuous, fully automatic method and apparatus for the manufacture of high quality lenses from a polymerizable monomeric liquid.

It is another object of the invention to provide a method and apparatus of the aforementioned character in which the activated monomeric liquid is constrained within a suitable mold and its temperature is precisely controlled throughout the entire curing process so that lenses of the highest quality can be reproducibly manufactured in large quantities.

It is another object of the invention to provide a method and apparatus as described in the preceeding paragraph in which during the curing cycle the heat of exotherm is effectively and continuously removed from each individual mold.

It is a further object of the invention to provide a method and apparatus of the class described in which during the curing cycle the individual molds containing the activated monomer are passed sequentially through collimated streams of air, the temperature of which is precisely controlled and regulated.

It is another object of the invention to provide an apparatus for the continuous manufacturing of high quality opthalmic lenses which is fully automatic, highly reliable, easy to operate and inexpensive to manufacture and maintain.

BRIEF DESCRIPTION OF THE DRAWINGS

FIG. 1 is a foreshortened, side elevational, cross-sectional view of one form of the apparatus of the invention.

FIG. 2 is a view taken along lines 2—2 of FIG. 1.

FIG. 3 is a view taken along lines 3—3 of FIG. 1 illustrating the arrangement of the upper and lower plenums of the apparatus and the arrangement of the intermediate passageway through which the molds carrying the material is passed.

FIG. 4 is a side elevational view of one of the intermediate air-circulation units of the apparatus showing the locations of the temperature controller, the blower, and the ducting interconnecting the upper and lower plenums of the unit.

DESCRIPTION OF ONE FORM OF THE INVENTION

Figure 5:
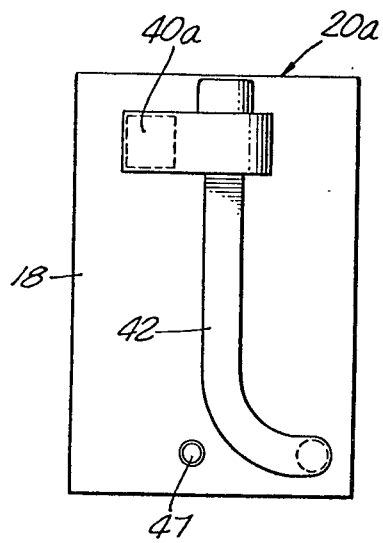
FIG. 5 is a view similar to FIG. 4 but showing a side elevational view of one of the end air-circulation units of the apparatus.

Referring to the drawings and particularly to FIGS. 1 and 3, the apparatus of the invention for controllably heating an exothermic liquid mixture can be seen to comprise an elongated enclosure 12 having interconnected top, bottom, and side walls 14, 16, and 18 respectively formed of sheet metal or the like. As illustrated in FIG. 1, in this embodiment of the invention, enclosure 12 is made up of a plurality of interconnected individual air-circulating units generally designated by the numeral 20. Each unit 20 includes an upper plenum 22 having an air inlet 24 (FIG. 3) and a transversely extending first or bottom wall 26 interconnected to side walls 18. With the exception of the units at the forward and rearward ends of the apparatus designated respectively as 20a and 20b, the bottom walls 26 of each unit are provided with a multiplicity of apertures 28 therein. As best seen by referring to FIG. 2, apertures 28 are formed in the bottom wall 26 in a series of parallel rows extending substantially the entire width of the unit. Also forming a part of each heating unit 20 is a lower plenum 30 having an air outlet 32 (FIG. 3) and a transversely extending second or top wall 34 interconnected to side walls 18. Again with the exception of the end units 20a and 20b, the top walls of each unit 20 are provided with a multiplicity of apertures 36. Apertures 36 are also formed in a series of parallel rows extending substantially the width of the unit. As indicated in FIG. 1, apertures 28 and 36 are located substantially in vertical alignment.

When the heating units 20 are interconnected in the manner illustrated in FIG. 1, they cooperate to define an elongated central passageway 38 disposed between upper and lower plenums 22 and 30 and extending the entire length of the apparatus.

In order that air may be controllably circulated between the upper and lower plenums through the central or intermediate passageway 38, each unit 20 is provided with air-circulating means. In the form of the invention shown in the drawings, the air-circulating means are provided in the form of a blower means 40 associated with each unit 20. Each blower means 40 is mounted on side wall 18, with its air outlet in open communication with upper plenum 22. The inlet side of each blower means is operably connected with lower plenum 30 by means of a conduit 42. In operation the blower means continuously draws air out of the lower plenum 30, pulls it through conduit 42, and introduces it into the upper plenum 22. As indicated by the arrows in FIG. 1, air entering the upper plenum 22 is then directed downwardly into central passageway 38 through apertures 28 formed in bottom wall 26 of the upper plenum. Blower means 40 can be one of several types of commercially available electrically driven centrifugal blowers. The blowers, however, must be of a size to force the air through the apertures 28 at a sufficient velocity to cause the formation of a multiplicity of a substantially collimated streams of air directed downwardly through intermediate passageway 38 toward apertures 36 formed in upper wall 34 of lower plenum 30. As will be discussed in greater detail hereinafter, when the air is heated within the upper plenum prior to being forced downwardly through apertures 28, a plurality of temperature zones can be formed longitudinally within intermediate passageway 38.

Figure 6:
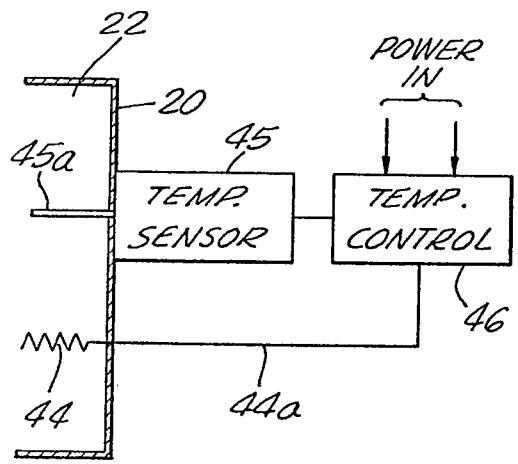
FIG. 6 is a generally schematic view illustrating the interconnection of the sensing, controlling, and heating means of the apparatus of the invention.

Mounted within upper plenum 22 of each heating unit 20 is heating means for controllably heating the air being circulated through intermediate passageway 38. In this embodiment of the drawings, the heating means is shown in the form of a plurality of electrically energized resistance elements 44 disposed within the upper plenum 22. Elements 44 may be constructed from solid metal resistance elements or from elongated coils of wire formed from nichrome or the like. Each of the heating elements 44 is supported within upper plenum 22 by vertical support members 43 and each is interconnected by a wire 44a with the temperature controller 46 (FIG. 4) of a type well known in the art for automatically controlling the temperature of the resistance element in response to signals received from a temperature sensing means 45. In this instance, the temperature sensing means forms a part of the temperature controller unit 46 and is adapted by means of a probe 45a which extends into the upper plenum 22 (FIG. 6) to continuously sense temperature of the air in various locations within the upper plenum of the heating units 20. As schematically illustrated in FIG. 6, the controller, in response to signals received from the temperature sensing means 45, then energizes and de-energizes the resistance elements as necessary to maintain the desired temperature of the air entering the central passageway 38. The design, installation, and interconnection of the temperature controller and temperature sensing means can easily be accomplished by those skilled in the art. Neither these elements nor their method of interconnection form a part of the present invention and therefore are not illustrated and described in detail herein. It is to be understood that depending upon the degree of temperature control desired and the number of temperature zones desired to be formed longitudinally of passageway 28, one or several temperature sensing and control means may be employed. In the drawings, only one such temperature controller is shown per unit 20. Additionally, for certain applications, it is advisable to monitor the temperature of the air in the lower plenums 30. For this purpose a thermometer 47 (FIGS. 1 and 3) is carried by side wall 18 and extends into lower plenum 30 of each unit 20.

Referring particularly to FIG. 1, end units 20a and 20b of the apparatus can be seen to be of slightly different construction from the other units which cooperate to form the elongated enclosure 12. In each of these units, the bottom and top wall 34a and 26a respectively, is provided with transversely extending slots 50. Slots 50 are disposed proximate the forward and rearward ends of passageway 38 and are disposed in vertical alignment. In the case of both of the units 20a and 20b the blower means designated by the numeral 40a is larger than the blower means 40 of the intermediate units. These blowers must be of a size sufficient to cause air to flow at high velocity between slots 50 across passageway 38. This flow of air at high velocity serves to form a curtain of air adapted to minimize heat loss through the forward and rearward open ends of passageway 38. With this arrangement, the temperature of the air flowing downwardly through passageway 38 intermediate its ends can more accurately be controlled.

As best seen by referring to FIGS. 1 and 3, the activated monomer from which the lens blanks is formed is carried in molds 52, the details of construction of which will presently be described. Molds 52, after being filled with the activated monomer, are placed within a carrier rack 54. Rack 54 is designed to hold the molds 52 in the spaced apart generally upright position illustrated in the drawings. These racks are preferably constructed of a heavy metal mesh material which will not impede the free passage of air through the base portion of the rack.

To carry the racks 54 through the central passageway of the apparatus at a controlled rate of speed, there is provided a conveyor means generally designated by the numeral 55. In the embodiment of the invention shown in the drawings, conveyor means 55 is of relatively simple construction comprising a pair of transversely spaced apart endless chain members 56 which pass around a drive sprocket 58 through passageway 38 and then around a driven sprocket 60 (FIG. 1). Drive sprocket 58 is driven by any suitable drive means such as a variable speed electric motor interconnected therewith by a drive chain 62 (not shown).

As best seen in FIG. 3, carrier rack 54 is provided with downwardly extending leg portions 64 which are receivable within the openings formed by the lengths of the conveyor chain 56. With this arrangement, as the conveyor chain moves forwardly through the apparatus within guide channels 66 provided along each edge of passageway 38 (FIG. 3), rack 54 will move at a uniform, controlled rate of speed through the center passageway of the apparatus.

Figure 8:
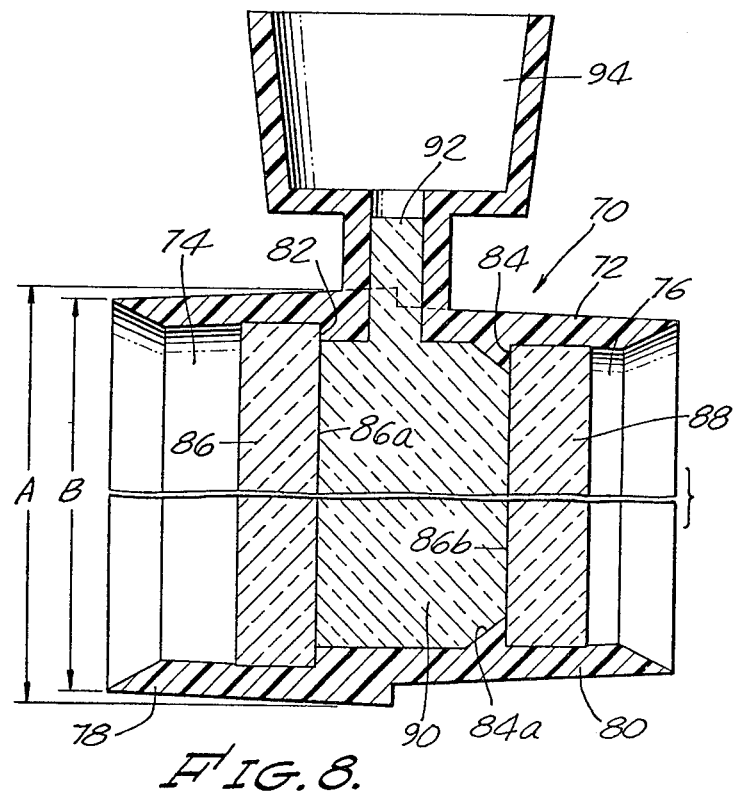
FIG. 8 is an enlarged, foreshortened, cross-sectional view of the lens mold taken along lines 8—8 of FIG. 7 illustrating the details of construction of the mold.
Figure 7:
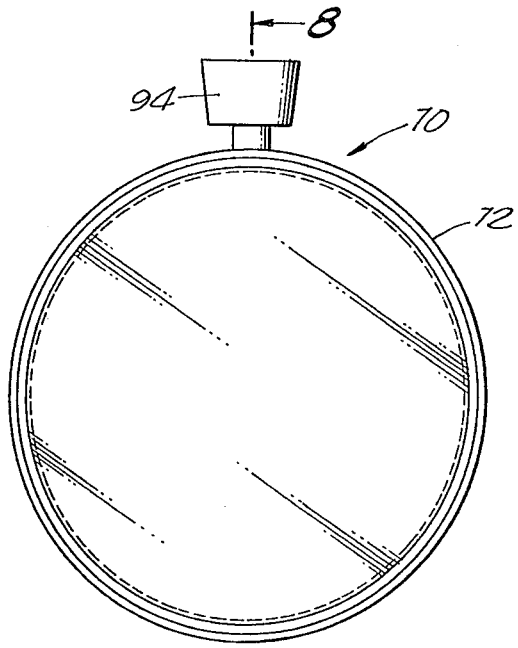
FIG. 7 is a side elevational view of the lens mold of the invention.

Referring to FIGS. 7 and 8, there is illustrated the unique lens forming mold of the invention. This mold, generally designated by the numeral 70, is adapted for use in forming lenses of predetermined shape from a polymerizable monomeric liquid of the character previously described herein. In the form of the invention illustrated in the drawings, mold 70 comprises a one-piece mold body 72 having first and second mold-member receiving chambers 74 and 76 respectively. These chambers, as seen in FIG. 7, are generally circular in cross section at any plane and are defined by relatively thin outer walls 78 and 80 which taper from a major diameter at their inner end to a smaller diameter at their open outer end. For purposes of illustration, the major and minor diameters of wall 78 are identified by the letters A and B respectively. Formed at the inner end of first and second chambers 74 and 76 are first and second annular shoulders 82 and 84 respectively. As best seen in FIG. 8, in this form of the invention annular shoulder 84 is provided with a radially outwardly tapering rear face 84a which expedites the lens forming and removal operations.

Removably receivable within chambers 74 and 76 are first and second shaping means shown here in the form of first and second disc-shaped mold members 86 and 88 respectively. These means are disposed in butting engagement with annular shoulders 82 and 84 so as to define therebetween a mold cavity 90 having the precise configuration of the lens desired to be formed. Both members 86 and 88 are provided with curved inner faces 86a and 88b, the curvature of which corresponds to the curvature desired on the front and rear faces of the lens to be formed. The diameter of members 86 and 88 is substantially equal respectively to the major diameter of the first and second chambers into which they are removably received.

Located above mold cavity 90 and in communication therewith by a fluid passageway 92 is a fluid reservoir 94. The walls of the reservoir and of the fluid passageway, as indicated in the drawings, may be integrally formed with the mold body 72 or alternatively the reservoir and fluid passageway may be formed separately and then interconnected with the mold body in any suitable manner.

The mold body, including walls 78 and 80, is preferably formed of a yieldably resilient plastic material such as polyethylene or the like. Members 86 and 88 may be formed from a plastic material, glass, or metal upon which smooth curved surfaces may accurately be formed. In actual practice, members 86 and 88 are typically blank lens masters formed from one of the previously identified monomeric materials.

In using the lens mold of the invention mold members having curved faces, corresponding to the curvature of the lens desired to be formed, are first selected. These members are then inserted into the open ends of cavities 74 and 76 by outwardly deforming the cavity walls 78 and 80. As illustrated in FIG. 8, when mold members 86 and 88 are moved into butting engagement with shoulders 82 and 84 respectively, the tapered configuration of walls 78 and 80 will resist any movement of the members away from the annular shoulders. With members 86 and 88 emplaced within the mold body, the activated liquid monomer can be introduced into mold chamber 90 by pouring it into reservoir 94. After the mold chamber is completely filled, the mold is placed onto a carrier rack 54 and heat-treated in the manner described in the examples set forth in the following section entitled "Operation."

OPERATION

The method of the invention and the operation of the apparatus of the invention is illustrated by the examples which follow.

EXAMPLE 1

The monomer used in this example was allyl diglycol carbonate manufactured by PPG Industries. The catalyst, or initiator, also manufactured by PPG Industries was isopropyl percarbonate. Approximately five thousand grams of allyl diglycol carbonate and approximately 150 grams isopropyl percarbonate were measured out and thoroughly mixed together in a suitable container by stirring. The mixture thus formed was then poured into molds 52, the construction of which is illustrated in FIGS. 7 and 8. Next, the molds were placed in carrier rack 54 in a manner illustrated in FIG. 1 with the molds disposed in a generally upright orientation. The conveyor speed was set at approximately 2.24 feet per hour and the rack placed upon the conveyor for transporting the molds through the central passageway of the interconnected heating units. During the first nine feet of travel of the molds through the heating units (approximately four hours elapsed time), the temperature of the air passing past the molds was gradually increased along the path of travel of the molds from about 42° C. to about 44° C. This was accomplished by carefully measuring the temperature of the air entering the upper plenum of the units and appropriately controlling the temperature of the heating elements past which the air flows before it is directed downwardly into the central passageway of the inter-connected heating units. Throughout this time the heat generated by the exothermic reaction of the monomer and catalyst was carried away from the individual molds by the downwardly directed collimated streams of air.

During the next nine feet of travel, the temperature of the air flowing past the molds was increased uniformly along the path of travel of the molds from about 44° C. to about 47° C. Again, the heat of exotherm was continuously removed from the material.

Along the next nine feet of the path of travel of the molds, the temperature of the air was uniformly increased from about 47° C. to about 54° C. The total elapsed time at the 27 foot point of travel being on the order of 12 hours.

During the final nine feet of travel of the molds, the temperature of the air was uniformly increased in the manner previously described from about 54° C. to about 70° C.

The carrier racks were then removed from the conveyor system and the material was allowed to uniformly cool to ambient room temperature. After cooling, the solidified lens blanks were removed from the molds for further processing. The lens blanks thus produced were substantially insoluable, infusible, optically clear and colorless.

EXAMPLE 2

In this example the monomer and catalyst of Example 1 was used. However, a greater weight percent catalyst was mixed with the monomer, namely 175 grams of catalyst to 5,000 grams of monomer. After the mixture was thoroughly stirred, it was poured into the molds of the configuration illustrated in FIGS. 7 and 8. The molds were placed in the carrier rack and the rack placed upon the conveyor. In carrying out this example, the conveyor speed was set at three feet per hour so that the total process time would be on the order of 12 hours. During the first 12 feet of travel of molds through the heating units (approximately four hours elapsed time), the temperature of the air passing the molds was gradually increased along the path of travel of the molds from about 45° C. to about 49° C. Again, the heat of exotherm was continuously drawn away from the individual molds by the downwardly directed streams of air.

During the next 12 feet of travel, the temperature of the air flowing past the molds was increased uniformly along the path of travel from about 47° C. to about 52° C. Along the final 12 feet of travel of the molds, the temperature of the air was uniformly increased from about 52° C. to about 74° C. As before, the carrier racks were removed from the conveyor system, the material was cooled and the blanks separated from the molds. A high quality optically clear lens blank was similarly produced by the method of Example 2.

EXAMPLE 3

In example 3, the same monomer and catalyst was again used. However, in this example, approximately 185 grams of isopropyl percarbonate was mixed with approximately 5,000 grams of allyl diglycol carbonate. After appropriate mixing, the material was again poured into molds. The molds were placed in a carrier rack and the carrier rack placed on the conveyor. For this example, the conveyor speed was set at about 4.5 feet per hour giving a total processing time of on the order of eight hours. During the first 18 feet of travel of the molds through the heating units (approximately four hours elapsed time), the temperature of the air flowing past the molds was increased along the path of travel of the molds from about 45° C. to about 49° C. During the next nine feet of travel of the molds (approximately six hours total elapsed time), the temperature of the air flowing downwardly through the passageway was increased from about 49° C. to about 56° C. During the final nine feet of travel of the molds, the temperature of the air was uniformly increased in the manner previously described from about 56° C. to about 80° C. After cooling, the lens blanks were removed from the molds. A small percentage of the lens blanks manufactured in accordance with the method of this example were observed to develop cracks during cooling. Those blanks which did not crack, however, exhibited excellent optical properties.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:
1. A method for the continuous, fully automatic, high volume manufacture of semi-finished or finished blanks for lenses using molds of appropriate shape comprising the steps of:

(a) dissolving within allyl diglycol carbonate isopropyl percarbonate in a quantity of approximately 3 percent by weight of the mixture;

(b) pouring the mixture thus formed into the molds each of which has the approximate shape of the blank desired to be formed;

(c) passing the molds at a controlled rate of speed of about 3 feet per hour in a time period of about 12 hours successively through a plurality of temperature zones created by a multiplicity of collimated air streams moving past the molds, the temperature of each of said temperature zones being controllably varied in accordance with the degree of exothermic reaction of said polymerizable monomeric liquid and being maintained between approximately 45° C. and approximately 74° C., whereby the heat of exotherm therefrom is controllably and continuously removed.

2. A method for the continuous, fully automatic, high volume manufacture of semi-finished or finished blanks for lenses using molds of appropriate shape comprising the steps of:

(a) dissolving within an allyl diglycol carbonate liquid an isopropyl percarbonate catalyst in a quantity sufficient to cause said liquid to polymerize;

(b) pouring the mixture thus formed into the molds, which molds have the approximate shape of the blank desired to be formed;

(c) passing said molds at a controlled rate of speed successively through a plurality of temperature zones created by a multiplicity of collimated air streams moving past said mold, the temperature of each said temperature zones being controllably varied within a temperature range of between 45° C. and 74° C. and the rate of speed of said molds being such that the exotherm is controllably removed from the material contained within said mold.

3. A method for the continuous, fully automatic, high volume manufacture of semi-finished or finished blanks for lenses using molds of appropriate shape comprising the steps of:

(a) dissolving within approximately 5,000 grams of allyl diglycol carbonate liquid approximately 150 grams of isopropyl percarbonate catalyst;

(b) pouring the mixture thus formed into the molds, which molds have the approximate shape of the blank desired to be formed;

(c) passing said molds at a controlled rate of speed of about 2 to 3 feet per hour through a first temperature zone created by a multiplicity of collimated air streams maintained at a temperature of between about 42° C. and 44° C.;

(d) passing said molds at a controlled rate of speed of about 2 to 3 feet per hour through a second temperature zone created by a multiplicity of collimated air streams maintained at a temperature of between about 44° C. to about 47° C.; and (e) passing said molds at a controlled rate of speed of about 2 to 3 feet per hour through a third temperature zone created by a multiplicity of collimated air streams maintained at a temperature of between about 54° C. to about 70° C.

4. A method as defined in claim 3 in which said molds traveled through each said first, second and third temperature zones in a time of about 4 hours.

* * * * *